(12) United States Patent
Shoji et al.

(10) Patent No.: US 9,222,546 B2
(45) Date of Patent: Dec. 29, 2015

(54) INTERLOCKING CHAIN UNIT

(71) Applicant: TSUBAKIMOTO CHAIN CO., Osaka (JP)

(72) Inventors: Ryuta Shoji, Osaka (JP); Shunji Sakura, Osaka (JP); Hiroyuki Mineyama, Osaka (JP); Atsuo Noguchi, Osaka (JP); Katsunori Sakai, Osaka (JP); Taku Horie, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 14/261,802

(22) Filed: Apr. 25, 2014

(65) Prior Publication Data

US 2014/0338303 A1 Nov. 20, 2014

(30) Foreign Application Priority Data

May 20, 2013 (JP) ................................ 2013-106559

(51) Int. Cl.
| | | |
|---|---|---|
| *B66D 3/26* | (2006.01) | |
| *F16G 13/20* | (2006.01) | |
| *B66F 13/00* | (2006.01) | |
| *F16H 19/06* | (2006.01) | |
| *B66F 3/06* | (2006.01) | |

(52) U.S. Cl.
CPC . *F16G 13/20* (2013.01); *B66F 3/06* (2013.01); *B66F 13/005* (2013.01); *F16H 19/0636* (2013.01)

(58) Field of Classification Search
CPC ... F16H 19/0636; F16G 13/20; F16G 13/005; B66F 3/06; B66F 13/005
USPC ........................................................ 254/358
See application file for complete search history.

(56) References Cited

U.S. PATENT DOCUMENTS

| | | | | |
|---|---|---|---|---|
| 3,645,146 | A * | 2/1972 | Nagin ........................ | 74/89.21 |
| 5,335,643 | A * | 8/1994 | Abate et al. .................. | 123/679 |
| 7,819,389 | B2 * | 10/2010 | Takeuchi et al. ............. | 254/358 |
| 7,921,986 | B2 * | 4/2011 | Ando et al. ................ | 198/468.6 |
| 8,984,975 | B2 * | 3/2015 | Saji et al. ..................... | 74/89.2 |
| 2010/0059727 | A1 * | 3/2010 | Suko et al. .................... | 254/358 |
| 2010/0140572 | A1 * | 6/2010 | Aoki ................................ | 254/1 |
| 2010/0229469 | A1 * | 9/2010 | Kanehira ....................... | 49/358 |
| 2013/0283945 | A1 * | 10/2013 | Kaisaku et al. .............. | 74/89.21 |
| 2013/0312554 | A1 * | 11/2013 | Saji et al. ..................... | 74/89.21 |

FOREIGN PATENT DOCUMENTS

JP 2012-145168 8/2012

* cited by examiner

*Primary Examiner* — David B Jones
(74) *Attorney, Agent, or Firm* — Sheridan Ross P.C.

(57) ABSTRACT

An interlocking chain unit includes a stepped rod that determines the positions of case plates in a pair and those of guide plates relative to each other. The stepped rod has a small-diameter part that passes through passage holes of the guide plates respectively. The stepped rod has opposite end portions fitting in countersunk holes respectively formed in respective inner surfaces of the case plates. The stepped rod has a large-diameter part with a guide plate side step abutting on a rim of the passage hole of the guide plate, and a case plate side step abutting on a rim of the countersunk hole of the case plate.

3 Claims, 7 Drawing Sheets

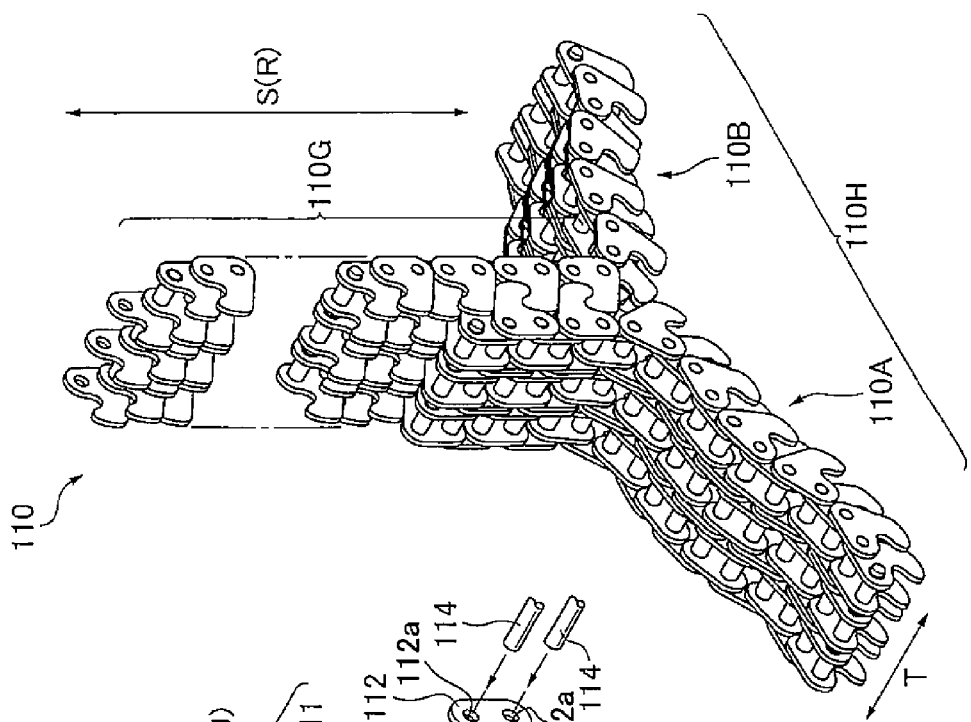
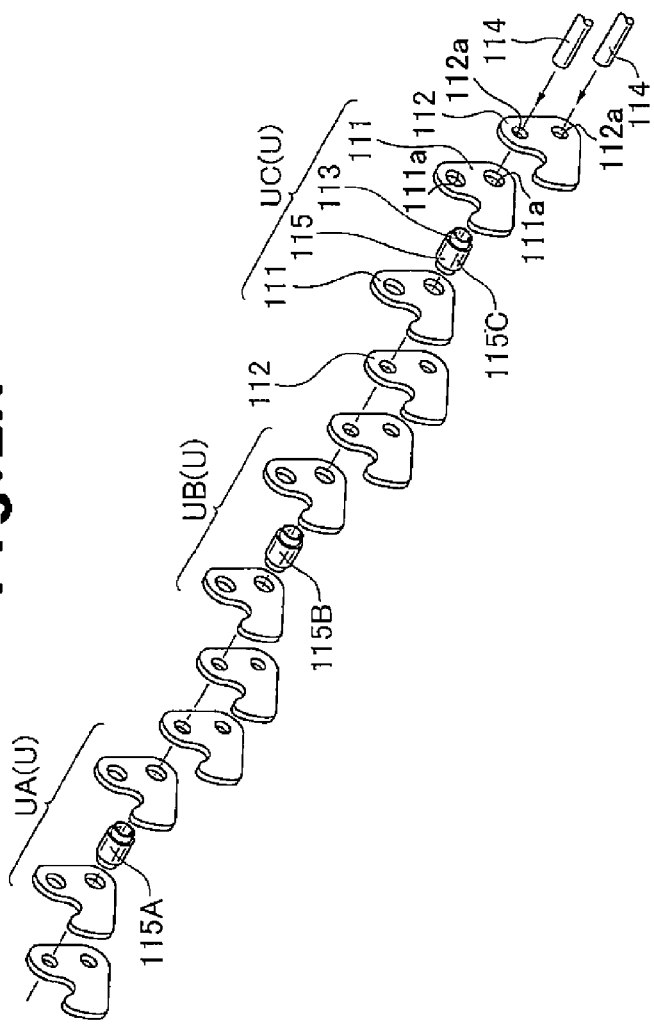

INTERLOCKING CHAIN UNIT

CROSS-REFERENCE TO RELATED APPLICATION

This application claims the benefit of Japanese Patent Application No. 2013-106559 filed May 20, 2013, the contents of which are incorporated herein by reference.

BACKGROUND OF THE INVENTION

This invention relates to an interlocking chain unit to be incorporated in an interlocking chain type forward and backward actuating device used for example in manufacturing facilities in various manufacturing fields, transportation facilities in the transportation field, nursing care facilities in medical and welfare fields, and stage facilities in art fields.

Japanese Patent Application Publication No. 2012-145168 discloses an interlocking chain type forward and backward actuating device including a base and an actuation target to move relative to the base. FIG. 6 shows an interlocking chain unit 700 of a first mode known as an interlocking chain unit to be incorporated in this device.

As shown in FIG. 6, the interlocking chain unit 700 includes a pair of case plates 720, a first guide plate 730A, a second guide plate 730B, a third guide plate 730C, a first hollow collar 750A, a second hollow collar 750B, a third hollow collar 750C, and a fourth hollow collar 750D. The pair of case plates 720 supports a sprocket shaft 770 such that the sprocket shaft 770 can rotate freely. The pair of case plates 720 forms part of a case for the interlocking chain unit 700. The pair of case plates 720 is configured to cover sprockets SP to transmit power to an interlocking chain not shown in the drawings, and a bifurcation area of each of the first to third guide plates 730A to 730C.

The first to third guide plates 730A to 730C are arranged between a first case plate 720A and a second case plate 720B forming the pair of case plates 720. The first to third guide plates 730A to 730C are configured to guide the interlocking chain, thereby shifting the interlocking chain between a state where the interlocking chain is disengaged and a state where the interlocking chain is interlocked to become rigid.

The first case plate 720A is given a screw hole 723A. The second case plate 720B is given a screw insertion hole 722B. The first, second, and third guide plates 730A, 730B, and 730C are given a passage hole 731A, a passage hole 731B, and a passage hole 731C respectively.

The first hollow collar 750A is arranged between the first case plate 720A and the first guide plate 730A. The second hollow collar 750B is arranged between the first and second guide plates 730A and 730B. Likewise, the third hollow collar 750C is arranged between the second and third guide plates 730B and 730C. The fourth hollow collar 750D is arranged between the third guide plate 730C and the second case plate 720B.

A fixing bolt 760 is threaded from the outside of the second case plate 720B into the screw hole 723A of the first case plate 720A while passing through the screw insertion hole 722B, the fourth hollow collar 750D, the passage hole 731C of the third guide plate 730C, the third hollow collar 750C, the passage hole 731B of the second guide plate 730B, the second hollow collar 750B, the passage hole 731A of the first guide plate 730A, and the first hollow collar 750A.

In this unit, the sprockets SP and the first to third guide plates 730A to 730C should be placed in positions precisely adjusted relative to each other. For this purpose, assembly of the unit proceeds while the positions of the first to third guide plates 730A to 730C are adjusted with respect to the pair of case plates 720. This however extends the time for assembling the unit while making it difficult to assure the precision of the position of each component.

More specifically, a gap between the pair of case plates 720 is determined by the sprocket shaft 770, so that it is susceptible to the thicknesses of the first to third guide plates 730A to 730C or the lengths of the first to fourth hollow collars 750A to 750D. This might cause a loose fit or an excessively tight fit of the fixing bolt 760. In either case, the assembled unit should be disassembled for shim adjustment.

In the aforementioned structure, a position as viewed in a direction perpendicular to a chain width direction T is determined based only on the diameter of the fixing bolt 760 and those of the passage holes 731A to 731C of the first to third guide plates 730A to 730C respectively. This also makes it difficult to sufficiently assure the precision of the positions of the sprockets SP and that of the positions of the first to third guide plates 730A to 730C relative to each other. This might be handled by an interlocking chain unit 800 of a second mode shown in FIG. 7.

As shown in FIG. 7, the interlocking chain unit 800 includes a pair of case plates 820, a first guide plate 830A, a second guide plate 830B, a third guide plate 830C, a first hollow collar 850A, a second hollow collar 850B, and a hollow stepped bar 890. The pair of case plates 820 supports a sprocket shaft 870 such that the sprocket shaft 870 can rotate freely. The pair of case plates 820 forms part of a case for the interlocking chain unit 800. The pair of case plates 820 is configured to cover sprockets SP and a bifurcation area of each the first to third guide plates 830A to 830C.

The pair of case plates 820 is composed of a first case plate 820A and a second case plate 820B. The first case plate 820A does not contact a fixing bolt 860. The first hollow collar 850A is arranged between the first and second guide plates 830A and 830B. The second hollow collar 850B is arranged between the second and third guide plates 830B and 830C.

The hollow stepped bar 890 has a large-diameter part and a small-diameter part smaller in diameter than the large-diameter part. The large-diameter part is arranged between the second case plate 820B and the third guide plate 830C. The small-diameter part passes through a passage hole 831C of the third guide plate 830C, the second hollow collar 850B, a passage hole 831B of the second guide plate 830B, the first hollow collar 850A, and a passage hole 831A of the first guide plate 830A. The fixing bolt 860 passes through the hollow stepped bar 890 from between the first case plate 820A and the first guide plate 830A and is threaded into a screw hole 823B of the second case plate 820B.

In the structure of the second mode, however, the cantilever structure of the fixing bolt 860 cannot assure the strength of the assembled interlocking chain unit 800 sufficiently. Further, a load applied from an interlocking chain might deflect the fixing bolt 860 easily and make guide plate deviate easily relative to a case plate.

SUMMARY OF THE INVENTION

It is an object of this invention to provide an interlocking chain unit having sufficient strength that makes adjustment of the position of a guide plate relative to a case plate and a sprocket unnecessary.

In order to solve the aforementioned problems, a first aspect of this invention provides an interlocking chain unit that forms a rigid chain part by forming an interlock between a pair of interlocking chains each including an inner tooth plate and an outer tooth plate arranged externally to the inner tooth plate. The interlocking chain unit includes: a pair of case plates arranged to be separate from and external to the pair of interlocking chains, the pair of case plates supporting a sprocket shaft such that the sprocket shaft can rotate freely; a guide plate arranged between the pair of case plates, the guide plate guiding the interlocking chains; and a stepped rod that determines the position of the pair of case plates and that of the guide plate relative to each other. The stepped rod has a small-diameter part and a large-diameter part, each extending in a chain width direction. The large-diameter part is near a first case plate forming the pair of case plates with respect to the center of the stepped rod. The large-diameter part has a guide plate side step near the guide plate and a case plate side step near the first case plate. The small-diameter part passes through a passage hole of the guide plate. The stepped rod has opposite end portions fitting in respective countersunk holes formed in inner surfaces of the pair of case plates. The guide plate side step abuts on a rim of the passage hole of the guide plate. The case plate side step abuts on a rim of a countersunk hole of the first case plate.

BRIEF DESCRIPTION OF THE DRAWINGS

FIG. 2A is an exploded perspective view of an interlocking chain.

FIG. 2B is a perspective view of the interlocking chain.

DETAILED DESCRIPTION OF THE PREFERRED EMBODIMENTS

The following describes an embodiment by referring to FIGS. 1 to 4 that embodies an interlocking chain unit of this invention.

Figure 1:
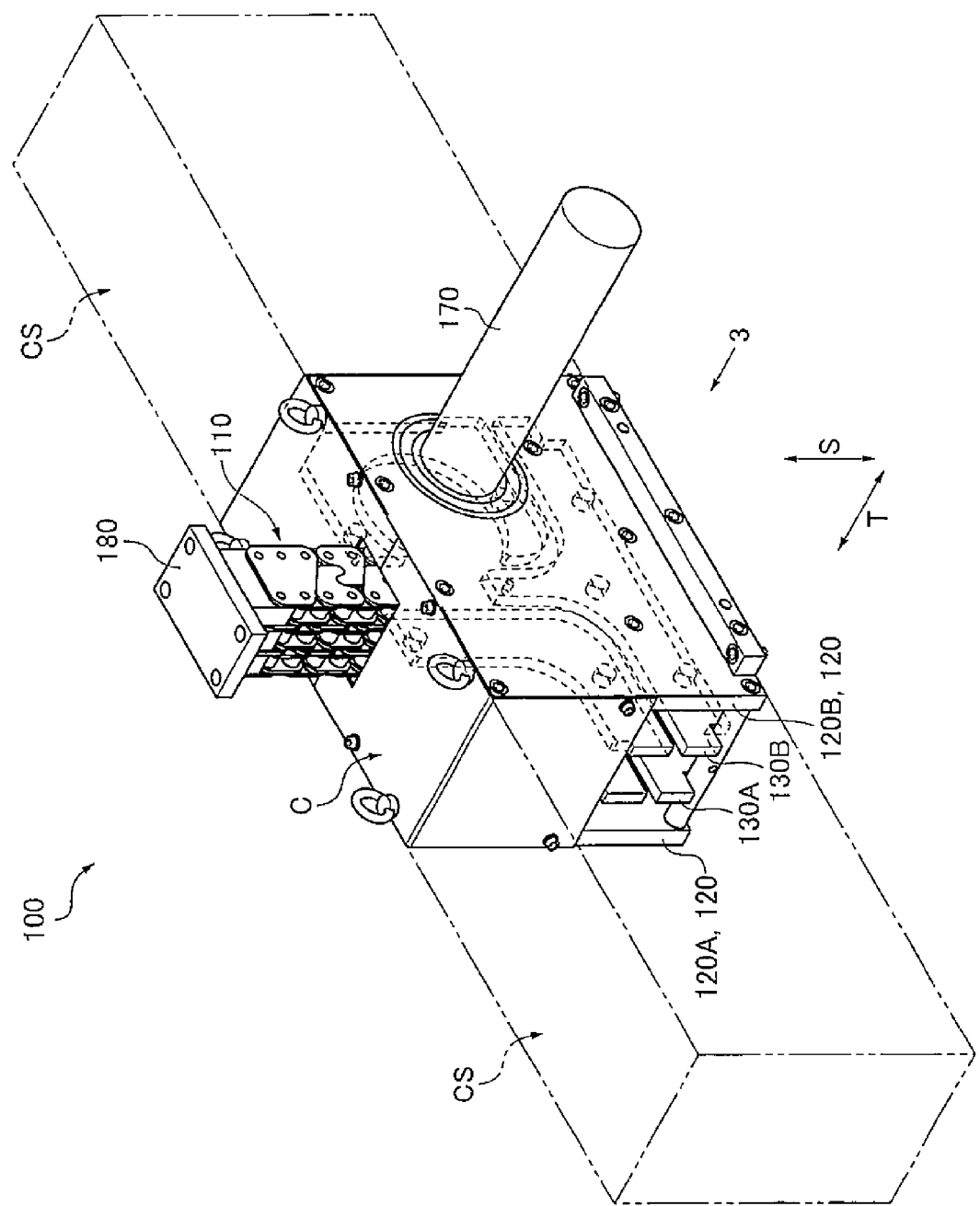
FIG. 1 is a perspective view showing an outline of an interlocking chain unit according to an embodiment of this invention.

As shown in FIGS. 1 to 2B, an interlocking chain unit 100 is configured to form an interlocking part 110G as a rigid chain part by forming an interlock between a pair of interlocking chains 110. Each of the interlocking chains 110 includes inner tooth plates 111 and outer tooth plates 112 arranged externally to the inner tooth plates 111 as viewed in a chain width direction.

The interlocking chain unit 100 further includes a pair of case plates 120, a first guide plate 130A, and a second guide plate 130B. The pair of case plates 120 is arranged to be separate from and external to the interlocking chains 110. The first and second guide plates 130A and 130B are arranged between the case plates 120 and guide the pair of interlocking chains 110. The pair of interlocking chains 110 passes through a bifurcation area of each of the first and second guide plates 130A and 130B while being guided by the first and second guide plates 130A and 130B, thereby switching the pair of interlocking chains 110 between a disengaged state and an interlocked state, in which the interlocking chains 110 become rigid.

The pair of case plates 120 supports a sprocket shaft 170 such that the sprocket shaft 170 can rotate freely. The pair of case plates 120 forms part of a case C for the interlocking chain unit 100. The pair of case plates 120 is configured to cover sprockets SP to transmit power to the pair of interlocking chains 110, and the bifurcation area of each of the first and second guide plates 130A and 130B.

As shown in FIGS. 2A and 2B, the pair of interlocking chains 110 is composed of a first interlocking chain 110A and a second interlocking chain 110B. The first interlocking chain 110A is composed of the inner tooth plates 111, the outer tooth plates 112, bushings 113, coupling pins 114, and rollers 115.

The inner tooth plates 111 are arranged to be separate from each other in the chain width direction T to form pairs. The inner tooth plates 111 each have a pair of end portions as viewed in a chain longitudinal direction. Each of the opposite end portions of each inner tooth plate 111 is given a bushing hole 111a. The outer tooth plates 112 are arranged externally to the inner tooth plates 111 to form pairs. The outer tooth plates 112 each have a pair of end portions as viewed in the chain longitudinal direction. Each of the opposite end portions of each outer tooth plate 112 is given a pin hole 112a.

The rollers 115 and the bushings 113 are both formed into a cylindrical shape. The bushings 113 pass through the rollers 115 such that they can rotate freely inside the rollers 115. The opposite end portions of each bushing 113 are press fitted into the bushing holes 111a of the inner tooth plates 111. The coupling pins 114 pass through the bushings 113 such that they can rotate freely inside the bushings 113. The opposite end portions of each coupling pin 114 are press fitted into the pin holes 112a of the outer tooth plates 112. In this way, the inner tooth plates 111 and the outer tooth plates 112 are assembled and are coupled in a chain longitudinal direction R.

The first and second interlocking chains 110A and 110B are each composed of inner tooth units U in three rows arranged in the chain width direction T each including the pair of inner tooth plates 111, the bushing 113, and the roller 115. In response to rotation in the normal direction of a drive motor of a decelerating unit not shown in the drawings, the power of the drive motor is transmitted through the sprockets SP on the sprocket shaft 170 to the interlocking chains 110 housed in two chain storages CS. This draws out each of the first and second interlocking chains 110A and 110B forming a disengagement part 110H of the pair of interlocking chains 110 and makes the first and second interlocking chains 110A and 110B travel forward in the chain longitudinal direction. The first and second interlocking chains 110A and 110B pass through the bifurcation area of each of the first and second guide plates 130A and 130B as they travel forward in the chain longitudinal direction. Then, the first and second interlocking chains 110A and 110B are interlocked with each other gradually to become one. Two guide slots 129A of the first guide plate 130A join to each other and two guide slots 129B of the second guide plate 130B join to each other. Thus, at this time, the first and second interlocking chains 110A and 110B are interlocked with each other to become one. The interlocking part 110G of the interlocking chains 110 having become rigid travels forward in the chain longitudinal direction.

In response to rotation in the reverse direction of the drive motor, the interlocking part 110G of the interlocking chains 110 passes through the bifurcation area of each of the first and second guide plates 130A and 130B while traveling backward. Then, the interlocking part 110G is disengaged to bifurcate. One guide slot 128A of the first guide plate 130A bifurcates and one guide slot 128B of the second guide plate 130B bifurcates. Thus, at this time, the interlocking part 110G of the interlocking chains 110 bifurcates into the first and second interlocking chains 110A and 110B. The bifurcating first and second interlocking chains 110A and 110B travel backward in corresponding chain longitudinal directions to be housed in corresponding chain storages CS.

Figure 4:
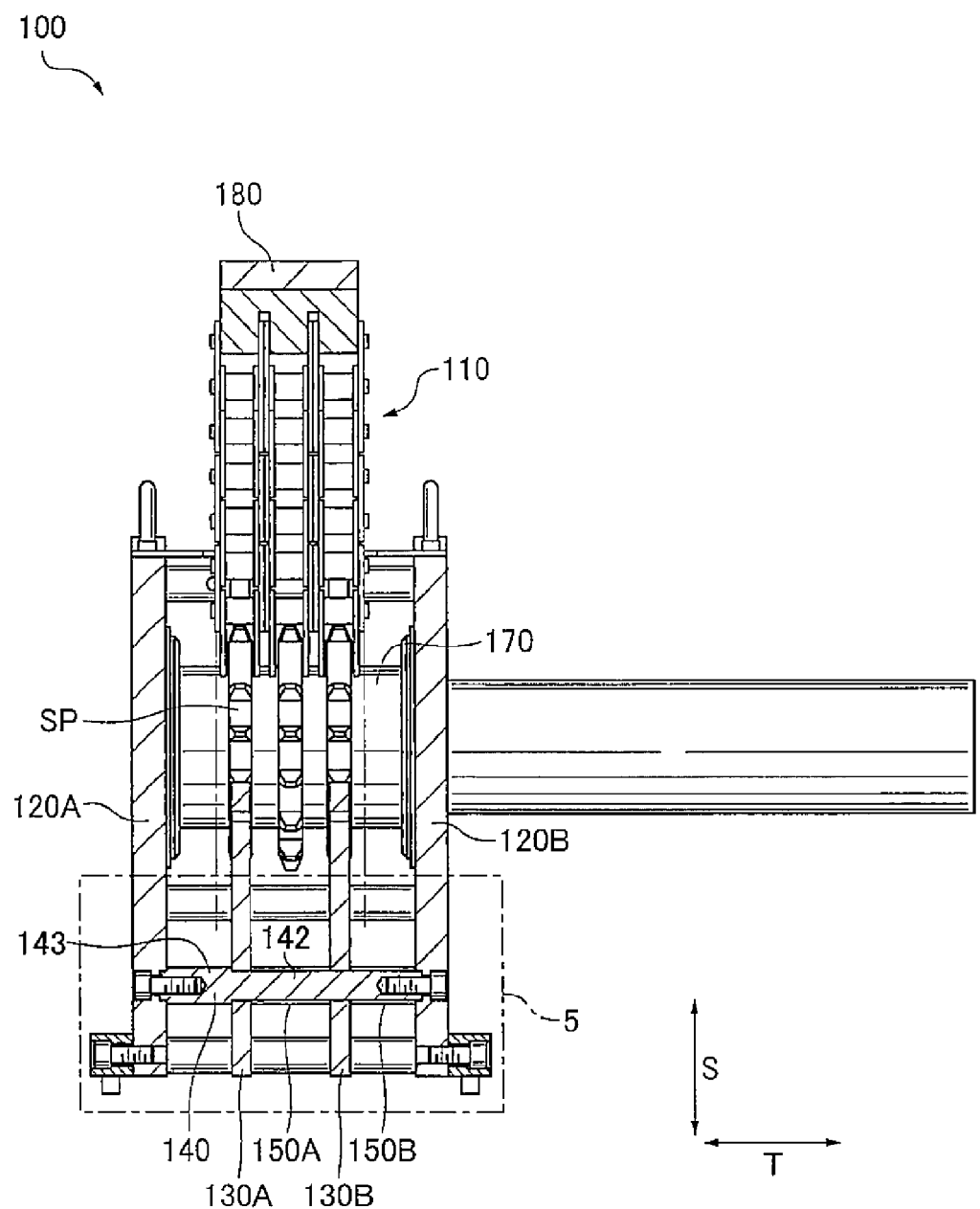
FIG. 4 is a sectional view taken along line 4-4 of FIG. 3.

In this way, the power of the drive motor is transmitted through the interlocking chains 110 to an actuation target 180, thereby moving the actuation target 180 in a forward and backward direction S. As shown in FIG. 4, the first guide plate 130A contacts a roller 115A of an inner tooth unit UA in a first row. The second guide plate 130B contacts a roller 115C of an inner tooth unit UC in a third row. A roller 115B of an inner tooth unit UB in a second row is arranged in a position where the roller 115B is not guided directly by the first and second guide plates 130A and 130B.

Figure 5:
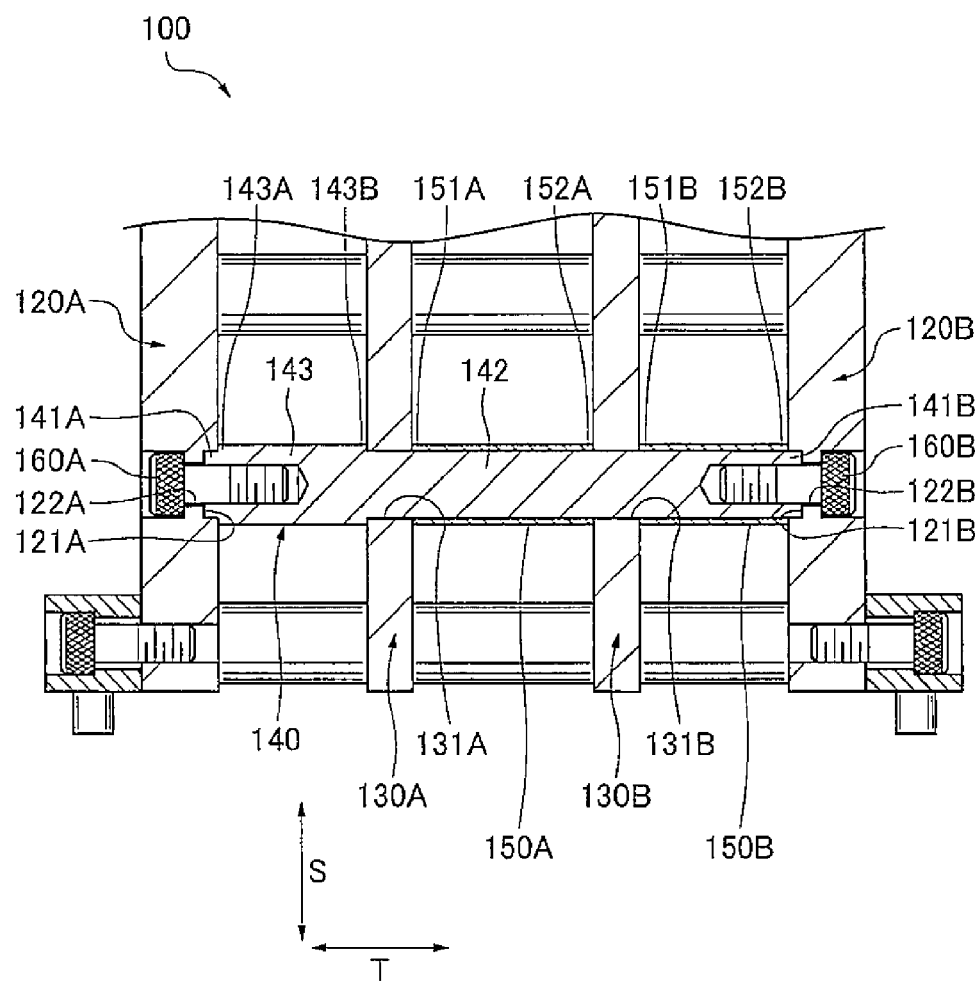
FIG. 5 is a partial sectional view showing in an enlarged manner an area indicated by sign 5 of FIG. 4.
Figure 6:
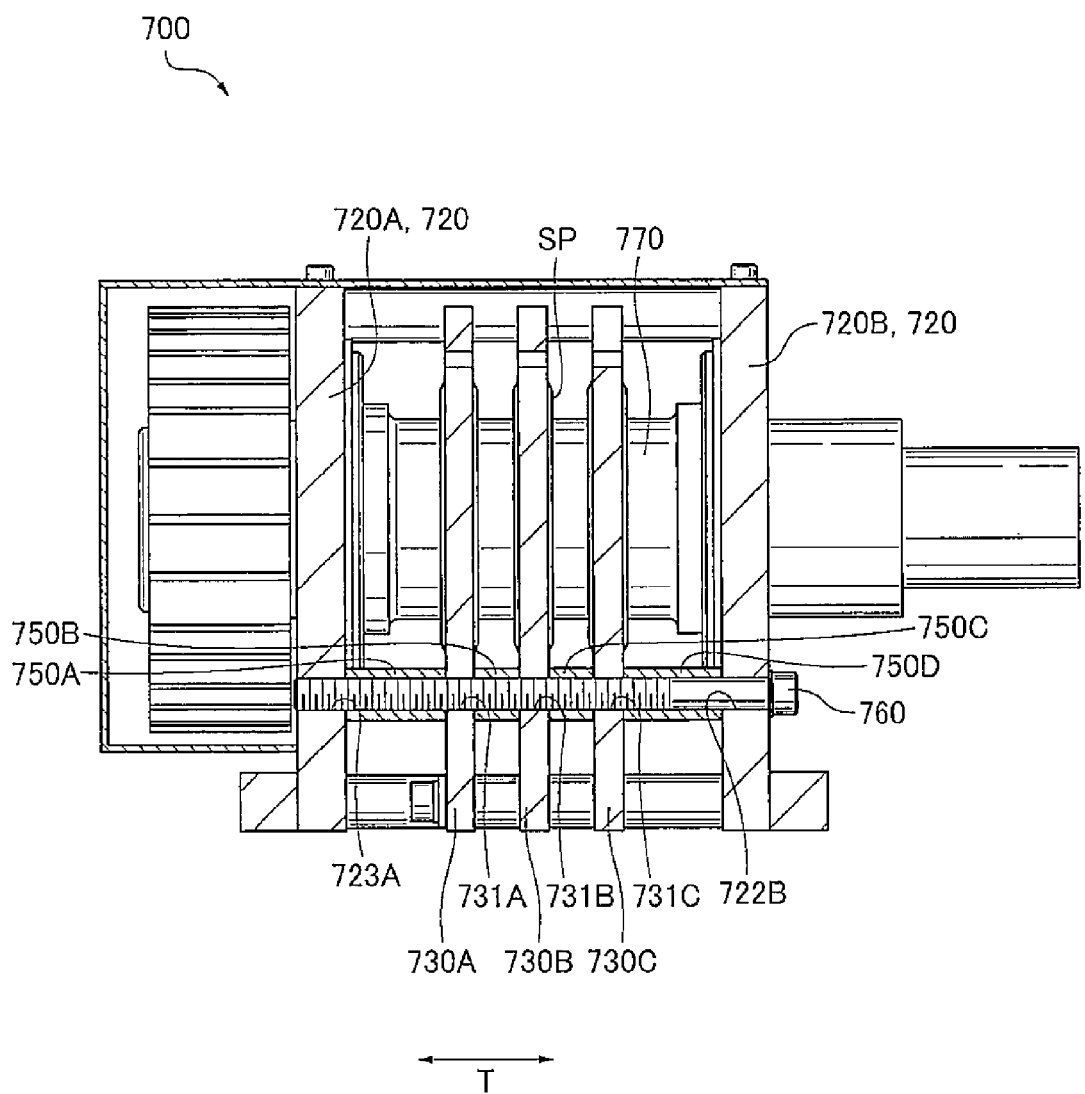
FIG. 6 is a side sectional view of an interlocking chain unit according to a first mode.
Figure 7:
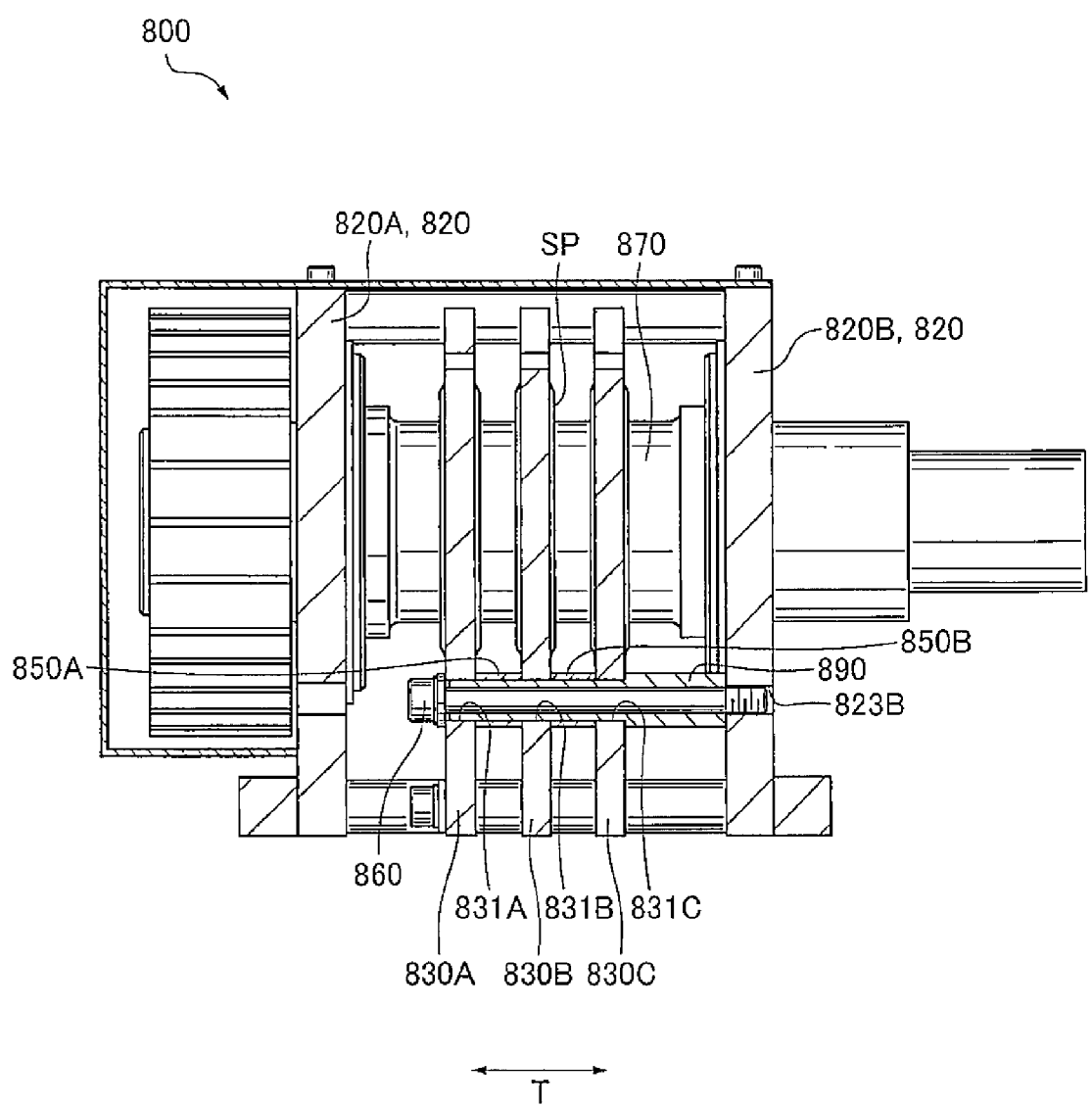
FIG. 7 is a side sectional view of an interlocking chain unit according to a second mode.

As shown in FIG. 5, the interlocking chain unit 100 further includes a solid stepped rod 140 that determines the positions of the first and second case plates 120A and 120B and those of the first and second guide plates 130A and 130B relative to each other. The solid stepped rod 140 has a small-diameter part 142 and a large-diameter part 143 each extending in the chain width direction T. The large-diameter part 143 is near the first case plate 120A with respect to the center of the solid stepped rod 140. A guide plate side step 143B is formed at a boundary between the small-diameter part 142 and the large-diameter part 143. A case plate side step 143A is formed at an end portion of the large-diameter part 143 on a side opposite the guide plate side step 143B.

The small-diameter part 142 passes through a passage hole 131A and a passage hole 131B of the first and second guide plates 130A and 130B respectively. The solid stepped rod 140 has a first end portion 141A and a second end portion 141B. An inner surface of the first case plate 120A is provided with a countersunk hole 121A in which the first end portion 141A of the solid stepped rod 140 fits. An inner surface of the second case plate 120B is provided with a countersunk hole 121B in which the second end portion 141B of the solid stepped rod 140 fits.

The outer diameter of the small-diameter part 142 is substantially the same as the inner diameters of the passage holes 131A and 131B. Accordingly, the small-diameter part 142 tightly fits in the passage holes 131A and 131B. The guide plate side step 143B abuts on the rim of the passage hole 131A of the first guide plate 130A. The case plate side step 143A abuts on the rim of the countersunk hole 121A of the first case plate 120A.

Thus, the positions of the first and second case plates 120A and 120B and those of the first and second guide plates 130A and 130B relative to each other can be determined only by fitting the first and second end portions 141A and 142B of the solid stepped rod 140 passing through the passage holes 131A and 131B into the countersunk holes 121A and 121B respectively. Fitting the first and second end portions 141A and 142B into the countersunk holes 121A and 121B can also precisely determine the positions of the sprockets SP and those of the first and second guide plates 130A and 130B relative to each other as viewed in a direction perpendicular to the chain width direction T.

Assembling the unit does not involve adjustment of the positions of the first and second guide plates 130A and 130B with respect to the pair of case plates 120. Additionally, fitting the first end portion 141A into the countersunk hole 121A of the first case plate 120A and fitting the second end portion 141B into the countersunk hole 121B of the second case plate 120B can support the solid stepped rod 140 at opposite end portions thereof as viewed in the longitudinal direction. This enhances the strength of the interlocking chain unit 100 to reduce vibration.

Figure 3:
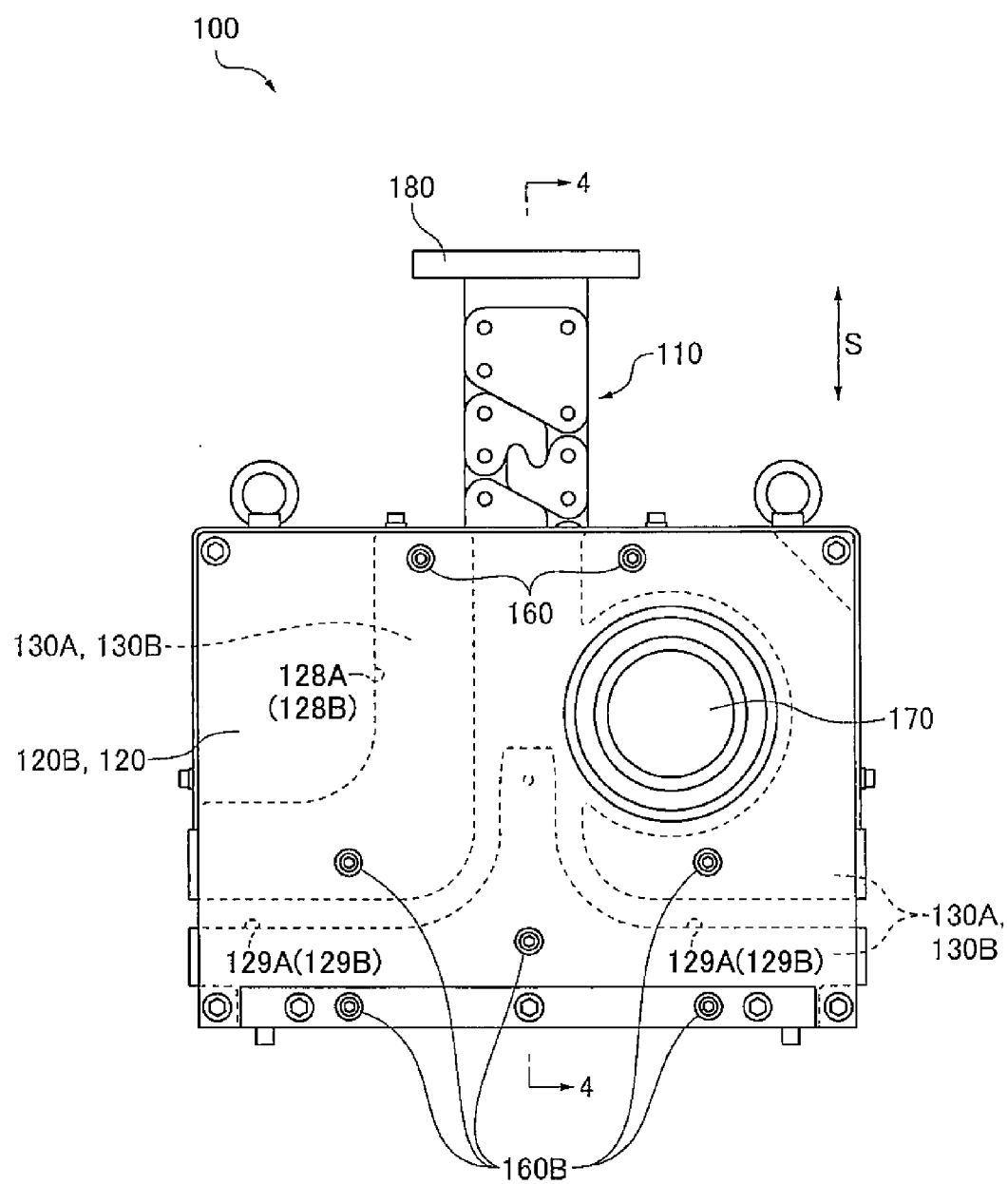
FIG. 3 is a front view of the interlocking chain unit as viewed from sign 3 of FIG. 1.

The solid stepped rod 140 is provided in a position corresponding to each of fixing bolts 160B shown in FIG. 3. As shown in FIG. 5, a first hollow collar 150A and a second hollow collar 150B are attached to the solid stepped rod 140. The first and second hollow collars 150A and 150B are arranged on a side opposite the large-diameter part 143 with respect to the first guide plate 130A abutting on the guide plate side step 143B. The solid stepped rod 140 penetrates through the insides of the first and second hollow collars 150A and 150B.

If there are multiple guide plates and multiple hollow collars and the number of the guide plates is the same as that of the hollow collars, the guide plates and the hollow collars are arranged alternately in the chain width direction T and an end portion of each of the hollow collars abuts on one of the guide plates or the second case plate 120B. More specifically, the first guide plate 130A, the first hollow collar 150A, the second guide plate 130B, and the second hollow collar 150B are arranged in the order named. The first hollow collar 150A has a first end portion 151A abutting on the first guide plate 130A and a second end portion 152A abutting on the second guide plate 130B. The second hollow collar 150B has a first end portion 151B abutting on the second guide plate 130B and a second end portion 152B abutting on the second case plate 120B.

Accordingly, a distance between the first and second guide plates 130A and 130B agrees with the length of the first hollow collar 150A. A distance between the second guide plate 130B and the second case plate 120B agrees with the length of the second hollow collar 150B. Further, a distance between the first case plate 120A and the first guide plate 130A agrees with the length of the large-diameter part 143 of the solid stepped rod 140, specifically, a length of the solid stepped rod 140 determined between the case plate side step 143A and the guide plate side step 143B.

If there is one guide plate and there is one hollow collar, the hollow collar has a first end portion abutting on the guide plate and a second end portion abutting on the second case plate 120B. Accordingly, a distance between the guide plate and the second case plate 120B agrees with the length of the hollow collar.

The first case plate 120A has a screw insertion hole 122A formed in a position concentric with the countersunk hole 121A. The screw insertion hole 122A penetrates through the first case plate 120A in the chain width direction T. A fixing bolt 160A is threaded from the outside of the first case plate 120A into an end portion of the solid stepped rod 140 while passing through the screw insertion hole 122A. The second case plate 120B has a screw insertion hole 122B formed in a position concentric with the countersunk hole 121B. The screw insertion hole 122B penetrates through the second case plate 120B in the chain width direction T. The fixing bolt 160B is threaded from the outside of the second case plate 120B into an end portion of the solid stepped rod 140 while passing through the screw insertion hole 122B. In this way, the solid stepped rod 140 is fixed to the pair of case plates 120, so that the strength of the interlocking chain unit 100 can be assured sufficiently.

The aforementioned interlocking chain unit 100 achieves the following effects.

(1) The interlocking chain unit 100 includes: the pair of case plates 120 arranged to be separate from and external to the pair of interlocking chains 110, the pair of case plates 120 supporting the sprocket shaft 170 such that the sprocket shaft 170 can rotate freely; the first and second guide plates 130A and 130B arranged between the pair of case plates 120, the first and second guide plates 130A and 130B guiding the interlocking chains 110; and the solid stepped rod 140 that determines the position of the pair of case plates 120 and those of the first and second guide plates 130A and 130B relative to each other. The solid stepped rod 140 has the small-diameter part 142 and the large-diameter part 143 each extending in the chain width direction T. The large-diameter part 143 is near the first case plate 120A forming the pair of case plates 120 with respect to the center of the solid stepped rod 140. The large-diameter part 143 has the guide plate side step 143B and the case plate side step 143A. The small-diameter part 142 passes through the passage holes 131A and 131B of the first and second guide plates 130A and 130B, respectively. The solid stepped rod 140 has the first and second end portions 141A and 141B fitting in the countersunk holes 121A and 121B respectively formed in inner surfaces of the pair of case plates 120. The guide plate side step 143B abuts on the rim of the passage hole 131A of the first guide plate 130A. The case plate side step 143A abuts on the rim of the countersunk hole 121A of the first case plate 120A.

This structure eliminates the need for adjusting the positions of the first and second guide plates 130A and 130B with respect to the pair of case plates 120 or adjusting the positions of the first and second guide plates 130A and 130B relative to the sprockets SP while or after the interlocking chain unit 100 is assembled. Specifically, this structure eliminates the need for adjusting the positions of the guide plates during assembly of the unit. This can shorten a time for assembly of the unit. This also enhances the strength of the interlocking chain unit 100, thereby reducing vibration or noise.

The interlocking chain unit 100 further includes the first and second hollow collars 150A and 150B arranged on a side opposite the large-diameter part 143 with respect to the first guide plate 130A abutting on the guide plate side step 143B. The solid stepped rod 140 penetrates through the insides of the first and second hollow collars 150A and 150B. The first and second guide plates 130A and 130B and the first and second hollow collars 150A and 150B are arranged alternately in the chain width direction T. The first hollow collar 150A has the first end portion 151A abutting on the first guide plate 130A and the second end portion 152A abutting on the second guide plate 130B. The second hollow collar 150B has the first end portion 151B abutting on the second guide plate 130B and the second end portion 152B abutting on the second case plate 120B.

This structure can precisely determine a distance between the first case plate 120A and the first guide plate 130A, a distance between the first and second guide plates 130A and 130B, and a distance between the second guide plate 130B and the second case plate 120B.

This embodiment can be changed as follows.

A sprocket to transmit the power of a drive motor can be provided to engage each of interlocking chains in a pair or to engage either one of these interlocking chains.

Inner tooth plates and outer tooth plates used in an interlocking chain unit can be of any shape, as long as the inner tooth plates and the outer tooth plates of the same type are interlocked with each other to become one and are disengaged from each other to bifurcate.

An interlocking chain may have a structure where a roller is attached to the outer circumferential surface of a bushing such that the roller can rotate freely, or a roller is attached to the outer circumferential surface of a coupling pin without intervention of a bushing such that the roller can rotate freely.

The opposite end portions of a solid stepped rod may be fixed to case plates with screws or press fitted into countersunk holes in inner surfaces of the case plates, as long as they fit in these countersunk holes.

The inner tooth unit U is composed of three rows of inner tooth units including the inner tooth unit UA in the first row and the inner tooth unit UC in the third row. The number of rows of the inner tooth units can be changed, if appropriate.

The number of guide plates can be the same as or different from that of the rows of inner tooth units U. If there are inner tooth units U in multiple rows, only guiding an inner tooth unit in at least one row can indirectly guide an inner tooth unit in a different row.

Effects relating to determining relative positions can be achieved only by threading the fixing bolt 160B to an end portion of the solid stepped rod 140 on a side opposite the large-diameter part 143. Specifically, the fixing bolt 160A is not required to be threaded to an end portion of the solid stepped rod 140 near the large-diameter part 143. However, in order to enhance the strength of the interlocking chain unit 100, it is desirable that the fixing bolt 160A be threaded to the end portion of the solid stepped rod 140 near the large-diameter part 143.

If sufficient strength is assured and the positions of guide plates relative to those of case plates are bilaterally symmetric, approximately half of the number of multiple solid stepped collars 140 can be placed in a direction opposite to that of the remaining stepped solid stepped rod 140. In this case, the solid stepped rod 140 may be fixed to a case plate with the fixing bolt 160B on a side opposite the large-diameter part 143 and the fixing bolt 160A near the large-diameter part 143 may be omitted. This reduces the number of screws and shortens a time for assembling a unit.

The invention claimed is:

1. An interlocking chain unit that forms a rigid chain part by forming an interlock between a pair of interlocking chains, each including an inner tooth plate and an outer tooth plate arranged externally to the inner tooth plate, the interlocking chain unit comprising:
   a pair of case plates positioned external to a pair of interlocking chains, and a sprocket shaft, wherein the pair of case plates supports the sprocket shaft such that the sprocket shaft can rotate freely;
   a guide plate arranged between the case plates, the guide plate guiding the interlocking chains, and the guide plate comprising a passage hole; and
   a stepped rod that determines the position of the pair of case plates and that of the guide plate relative to each other, wherein
   the stepped rod has a small-diameter part and a large-diameter part, each extending in a chain width direction,
   the large-diameter part is near a first case plate of the pair of case plates with respect to a center of the stepped rod,
   the large-diameter part has a guide plate side step near the guide plate and a case plate side step near the first case plate,
   the small-diameter part passes through a passage hole provided in the guide plate,
   each of the pair of case plates comprising an inner surface, and the stepped rod has opposite end portions fitting in respective countersunk holes formed in the inner surfaces of the case plates,
   the guide plate side step abuts on a rim of the passage hole of the guide plate, and
   the case plate side step abuts on a rim provided on a countersunk hole disposed in the first case plate.

2. The interlocking chain unit according to claim 1, further comprising a hollow collar arranged on a side opposite the large-diameter part with respect to the guide plate abutting on the guide plate side step, wherein the stepped rod passes through an interior of the hollow collar, and wherein the hollow collar has a first end portion abutting on the guide plate and a second end portion abutting a second case plate forming the pair of case plates.

3. The interlocking chain unit according to claim 1, further comprising a hollow collar arranged on a side opposite the large-diameter part with respect to the guide plate abutting on the guide plate side step, wherein the stepped rod passes through an interior of the hollow collar, and a second guide plate and a second hollow collar, wherein the number of the guide plates is the same as that of the hollow collars, wherein the guide plates and the hollow collars are arranged alternately in the chain width direction, and an end portion of each of the hollow collars abuts at least one of the guide plates and a second case plate forming the pair of case plates.

\* \* \* \* \*